US006009102A

United States Patent [19]
Horikawa et al.

[11] Patent Number: 6,009,102
[45] Date of Patent: Dec. 28, 1999

[54] NHRP PACKET AUTHENTICATION METHOD AND NHRP SERVER

[75] Inventors: Koichi Horikawa; Atsushi Iwata, both of Tokyo, Japan

[73] Assignee: NEC Corporation, Tokyo, Japan

[21] Appl. No.: 08/910,170

[22] Filed: Aug. 13, 1997

[30] Foreign Application Priority Data

Aug. 15, 1996 [JP] Japan ..................................... 8-215746
Dec. 20, 1996 [JP] Japan ..................................... 8-342179

[51] Int. Cl.⁶ .................................................. H04L 12/56
[52] U.S. Cl. ........................... 370/401; 370/466; 370/475
[58] Field of Search ..................................... 370/230, 235, 370/389, 392, 395, 400, 401, 407, 463, 465, 466, 467, 469, 475; 709/249, 230, 228

[56] References Cited

U.S. PATENT DOCUMENTS

| | | | |
|---|---|---|---|
| 5,583,862 | 12/1996 | Callon ...................................... | 370/397 |
| 5,600,644 | 2/1997 | Chang et al. ............................. | 370/404 |
| 5,617,540 | 4/1997 | Civanlar et al. ......................... | 395/200.57 |
| 5,699,347 | 12/1997 | Callon ..................................... | 370/238 |
| 5,809,233 | 9/1998 | Shur ........................................ | 709/230 |
| 5,822,320 | 10/1998 | Horikawa et al. ....................... | 370/396 |
| 5,828,844 | 10/1998 | Civanlar et al. ......................... | 709/228 |

OTHER PUBLICATIONS

James V. Luciani et al., "NBMA Next Hop Resolution Protocol (NHRP)", Internet Engineering Task Force (IETF), Sep. 1997, pp. 1–49, Dec. 1996, pp. 1–48.

*Primary Examiner*—Ricky Ngo
*Attorney, Agent, or Firm*—Sughrue, Mion, Zinn, Macpeak & Seas, PLLC

[57] ABSTRACT

An authentication method in an NHRP (Next Hop Resolution Protocol) for performing an address resolution for converting a network layer address in an NBMA (Non-broadcast, Multi-access) network to a datalink layer address. The method comprises steps of: providing an NHRP server for performing an address resolution which has a plurality of interfaces belonging to respective sub-networks, maintaining authentication keys and authentication types respectively allocated to the interfaces in the NHRP server; authenticating an NHRP packet received from one of the interfaces by using the authentication key allocated to the interface which receives the NHRP packet; and discarding the NHRP packet in case of authentication being unauthorized. The method is capable of setting for each domain a mode for redirecting an NHRP (Next Hop Resolution Protocol) packet when authentication types between LIS (Logical IP Subnet, IP: Internet Protocol) are different and a mode for when an NHRP packet is redirected between domains.

10 Claims, 6 Drawing Sheets

| INTERFACE NUMBER | AUTHENTICATION KEY | AUTHENTICATION TYPE |
|---|---|---|
|  |  |  |
|  |  |  |
| ⋮ | ⋮ | ⋮ |
|  |  |  |

FIG. 3

| INTERFACE NUMBER | AUTHENTICATION KEY | AUTHENTICATION TYPE |
|---|---|---|
| 1 | KEY B | MD5 |
| 2 | KEY C | CLEAR TEXT |

FIG. 4

| INPUT INTERFACE NUMBER | OUTPUT INTERFACE NUMBER | AUTHENTICATION MODE |
|---|---|---|
|  |  |  |
|  |  |  |
| ⋮ | ⋮ | ⋮ |
|  |  |  |

FIG. 5

| INPUT INTERFACE NUMBER | OUTPUT INTERFACE NUMBER | AUTHENTICATION MODE |
|---|---|---|
| 1 | 2 | FORWARD MODE |
| 2 | 1 | DROP MODE |

FIG. 6

| TYPE OF NHRP PACKET** | AUTHENTICATION MODE | | |
|---|---|---|---|
| | DROP MODE | FORWARD MODE | GATEWAY MODE |
| RESOLUTION REQUEST | SEND BACK NEGATIVE REPLY PACKET | CHANGE AUTHENTICATION KEY OF RECEIVED PACKET AND REDIRECT PACKET | IF ADDRESS TO BE RESOLVED IS IP-REACHABLE, REPLY ADDRESS INFORMATION OF NHS ITSELF OR ADDRESS INFORMATION OF OTHER ROUTER |
| RESOLUSION REPLY | DISCARD RECEIVED PACKET AND SEND BACK ERROR PACKET* | CHANGE AUTHENTICATION KEY OF RECEIVED PACKET AND REDIRECT PACKET | DISCARD RECEIVED PACKET AND SEND BACK ERROR PACKET* |
| PURGE REQUEST | DISCARD RECEIVED PACKET AND SEND BACK ERROR PACKET* | CHANGE AUTHENTICATION KEY OF RECEIVED PACKET AND REDIRECT PACKET | DISCARD RECEIVED PACKET AND SEND BACK ERROR PACKET* |
| PURGE REPLY | DISCARD RECEIVED PACKET AND SEND BACK ERROR PACKET* | CHANGE AUTHENTICATION KEY OF RECEIVED PACKET AND REDIRECT PACKET | DISCARD RECEIVED PACKET AND SEND BACK ERROR PACKET* |

\* : NHRP ERROR INDICATION PACKET (ERROR CODE = AUTHENTICATION FAILURE)

\*\*: NHRP ERROR INDICATION PACKET IS NOT AUTHENTICATED.

FIG. 7

NHRP PACKET AUTHENTICATION METHOD AND NHRP SERVER

BACKGROUND OF THE INVENTION

1. Field of the Invention

The present invention relates to an address resolution method using NHRP (Next Hop Resolution Protocol) in an NBMA (Non-Broadcast, Multi-Access) network and an NHRP server, and in particular to an authentication method of NHRP packets and an NHRP server which can perform the authentication method.

2. Description of the Prior Art

An NBMA network, typified by an ATM (Asynchronous Transfer Mode) network, is a network which is not media-shared. The use of NHRP as a protocol for address resolution in an NBMA network has, for example, been discussed in the IETF (Internet Engineering Task Force) and the protocol is specified in texts such as the electronic document "draft-ietf-rolc-nhrp-08.txt" by V. Luciani et al. and the document has now been updated to "draft-ietf-rolc-nhrp-11.txt". These documents can be obtained from various FTP (File Transfer Protocol) sites on the Internet.

NHRP is used for realizing transmission from a source station to a destination station via networks in which broadcasting has not been implemented such as X.25 networks and ATM networks, or networks not wanting to use broadcasting such as a large-scale Ethernet sub-network.

NHRP will next be explained. This explanation refers to an example in which the NBMA network is an ATM network and an IP (Internet Protocol) is used as the upper layer protocol, but identical results are obtained when a network other than an ATM network is used as the NBMA network or a protocol other than IP is used as the network layer protocol.

In order to perform IP communication on an ATM network, the ATM address, which is a datalink layer address, of the communication partner must be obtained based on the IP address, which is a network layer address, of the communication partner. With NHRP, NHRP servers (NHS) are placed in certain areas (for example, in each LIS [Logical IP Subnet]) for distributed administration of correspondence between the IP addresses and ATM addresses of ATM terminals connected to the ATM network.

When an ATM terminal connected to the network wants to resolve an ATM address for an IP address of a certain communication partner, an NHRP resolution request packet is sent to a predetermined NHS. When the NHS which has received the NHRP resolution request packet is able to resolve the address, the NHS sends back an NHRP resolution reply packet to the source ATM terminal. When the NHS is not able to resolve the address, the NHS redirects the NHRP resolution request packet to another NHS which is likely to be in charge of the relevant IP address. In other words, the NHRP resolution request packet is redirected between multiple NHS servers on the network until it reaches an NHS capable of resolving the address.

As a result, provided that the communication partner is directly connected to the ATM network, it is possible to resolve the communication partner's ATM address even in a case in which the communication partner belongs to a different LIS. When the communication partner is not directly connected to the ATM network, the ATM address of an exit router or a gateway in the ATM network can be resolved, and thus, IP communication to the communication partner can be performed using this ATM address.

Having received an NHRP packet, the NHS performs end-to-end authentication or hop-by-hop authentication depending on the packet type; i.e. the NHS performs end-to-end authentication when the NHRP packet is an NHRP registration request packet or an NHRP registration reply packet and performs hop-by-hop authentication when the NHRP packet is of any other type.

However, a conventional NHRP authentication method stipulates that an authentication extension be appended to the extension part of the NHRP packet prior to authentication processing. Keyed MD5 and Clear Text Password (hereinafter abbreviated to 'MD5' and 'Clear Text') are the stipulated authentication types. Since this extension part is not essential to an NHRP packet, there are cases in which authentication extension is not appended. In such a case there is deemed to be no authentication type. Thus a total of three differing authentication types are stipulated.

Although a plurality of authentication types are stipulated, the handling of these differing authentication types in a conventional NHRP is not clear. Consequently, particularly in a case where the NHRP packet which is to be authenticated using hop-by-hop authentication is redirected from one LIS to another LIS, when the authentication types of these two LIS are different, the authentication operation is delegated to the system implementation.

Furthermore, networks generally have a network policy determined for each domain of network administration. For instance, one domain in the network may want to adopt a policy of not redirecting NHRP packets between LIS of differing authentication types. Another domain in the network may want to adopt a policy according to which NHRP packets may acceptably be redirected between LIS of differing authentication types. With NHRP, it is also desirable to be able to determine a policy regarding the handling of NHRP packets between LIS of differing authentication types for each domain of the network. However, with a conventional NHRP there has been a problem that it becomes impossible to maintain interoperability of authentication between NHRP servers of different vendors. In other words, the conventional NHRP cannot operate with the authentication policy described above wherein a policy is determined for each domain.

Furthermore, between a plurality of domains in the same NBMA network it may be desirable to adopt a policy of not redirecting NHRP packets between different domains irrespective of whether identical authentication types or different authentication types are used. Conversely, among another plurality of domains, it may be desirable to adopt a policy wherein NHRP packets may acceptably be redirected between differing domains irrespective of whether identical authentication types or differing authentication types are used. In other words, it is also desirable to be able to determine a policy regarding the handling of NHRP packets among domains on a network. However, with a conventional NHRP there has been a problem that NHRP cannot work due to the authentication policies between the domains as described above.

SUMMARY OF THE INVENTION

It is therefore the object of the present invention to provide an authentication method capable of setting for each domain a mode for redirecting an NHRP packet when authentication types between LIS are different and a mode for when an NHRP packet is redirected between domains.

A further object of the present invention is to provide an authentication method capable of maintaining interoperability between NHS of differing vendors when redirecting an NHRP packet.

A still further object of the present invention to provide an NHRP server capable of setting for each domain a mode for redirecting an NHRP packet when authentication types between LIS are different and a mode for when an NHRP packet is redirected between domains.

The objectives of the present invention are realized by an NHRP packet authentication method in an NHRP (Next Hop Resolution Protocol) for performing an address resolution for converting a network layer address in an NBMA (Non-broadcast, Multi-access) network to a datalink layer address, comprising steps of: providing an NHRP server for performing an address resolution which has a plurality of interfaces belonging to respective sub-networks; maintaining an authentication key and an authentication type of the authentication key allocated to each of the interfaces in the NHRP server; authenticating an NHRP packet received from one of the interface by using the authentication key allocated to the interface which receives the NHRP packet; and discarding the NHRP packet in case of authentication being unauthorized.

The other object of the present invention is realized by an NHRP (Next Hop Resolution Protocol) server for performing an address resolution for converting a network layer address in an NBMA (Non-broadcast, Multi-access) network to a datalink layer address, comprising: a plurality of interfaces belonging to respective sub-networks; memory means for maintaining an authentication key and an authentication type of the authentication key allocated to each of the interfaces; and processing means for authenticating an NHRP packet received from one of the interfaces by using the authentication key allocated to the interface which receives the NHRP packet and discarding the NHRP packet in case of authentication being unauthorized.

According to the present invention, each NHS (NHRP server) comprises, for example, an authentication mode table, and each NHS is able to change the authentication method when redirecting an NHRP packet by setting any one of, for example, 'drop mode', 'forward mode' and 'gateway mode' in the authentication table. The mode for redirecting an NHRP packet when authentication types differ between LIS and the mode for performing redirection of an NHRP packet between domains can thereby be set for each domain. Moreover, interoperability can be maintained between NHS of vendors with differing authentication methods.

The above and other objects, features, and advantages of the present invention will become apparent from the following description referring to the accompanying drawings which illustrate an example of a preferred embodiment of the present invention.

BRIEF DESCRIPTION OF THE DRAWINGS

FIG. 3 is a diagram showing a general configuration of an authentication key table;

FIG. 4 is a diagram showing an example of the contents of an authentication key table;

FIG. 5 is a diagram showing a general configuration of an authentication mode table;

FIG. 6 is a diagram showing an example of the contents of an authentication mode table;

FIG. 7 is a diagram depicting an example of NHRP packet processing in each authentication mode.

DESCRIPTION OF THE PREFERRED EMBODIMENT

The preferred embodiment of the present invention will next be explained. For reasons of convenience, the NBMA (Non-broadcast, Multi-access) network is an ATM (Asynchronous Transfer Mode) network and an IP (Internet Protocol) is used as the upper layer protocol in the following explanation. But identical results are obtained when a network other than an ATM network used as the NBMA network or a protocol other than IP is used as the network layer protocol.

Figure 1:
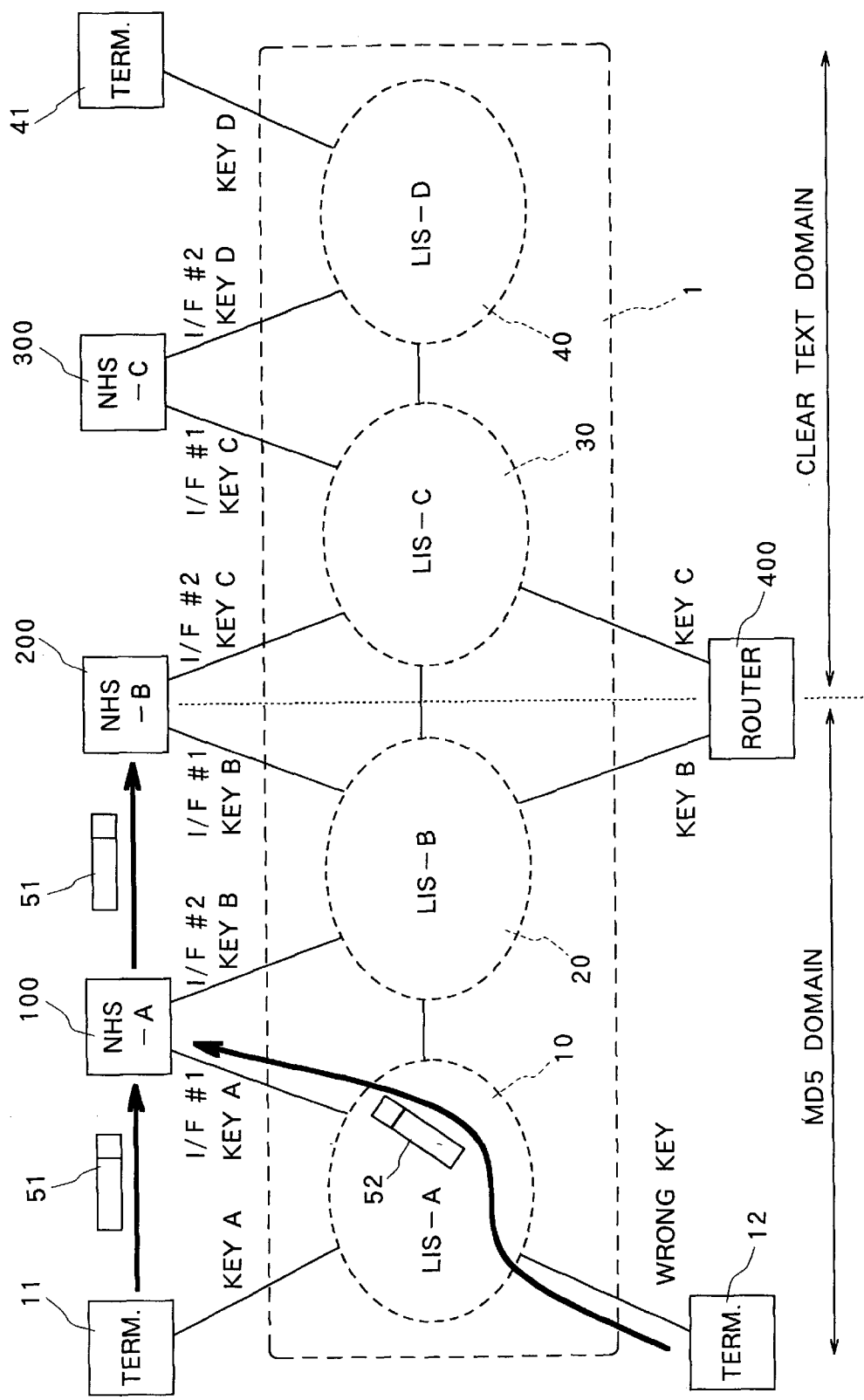
FIG. 1 is a diagram showing an example of a configuration of a network to which an authentication method of the present invention is applied.

In the network shown in FIG. 1, a plurality of LIS (Logical IP subnet) (e.g., LIS-A 10, LIS-B 20, LIS-C 30, LIS-D 40) are defined on a single ATM network 1. The terminals directly connected to the ATM network 1 (e.g., terminals 11, 12, 41) can together set up an SVC (Switched Virtual Connection) at the ATM level. ATM switches required to form the ATM network are omitted from FIG. 1. Of the connection lines between the sub-networks, network, only those relevant to the explanation are shown in the drawing.

NHRP (Next Hop Resolution Protocol) servers NHS-A 100, NHS-B 200 and NHS-C 300 are provided to the ATM network 1. NHS-A 100 has interfaces belonging respectively to LIS-A 10 and LIS-B 20; NHS-B 200 has interfaces belonging respectively to LIS-B 20 and LIS-C 30; and NHS-C 300 has interfaces belonging respectively to LIS-C 30 and LIS-D 40. In addition, a router 400 is provided for connecting LIS-B 20 and LIS-C 30.

In this example, it is assumed that the network has been set beforehand so that NHS-A 100 controls LIS-A 10, NHS-B 200 controls LIS-B 20, and NHS-C 300 controls LIS-C 30 and LIS-D 40.

In the network shown in FIG. 1, the network administrator determines an authentication type and authentication key for each LIS. For example, it is supposed that MD5 authentication is performed in LIS-A 10 using a key A for MD5. Similarly, it is supposed that MD5 authentication is performed in LIS-B 20 (using key B), clear text authentication is performed in LIS-C 30 (using key C) and clear text authentication is performed in LIS-D 40 (key D). Furthermore, all the stations belonging to each LIS are programmed with the authentication key and authentication type settings of each respective LIS. For instance, terminal 11 of LIS-A 10 is set to key A. Any given setting method may be used to set the authentication keys. Also, since an NHS (NHRP Server) generally comprises multiple interfaces, an authentication key is set at each interface.

Figure 2:
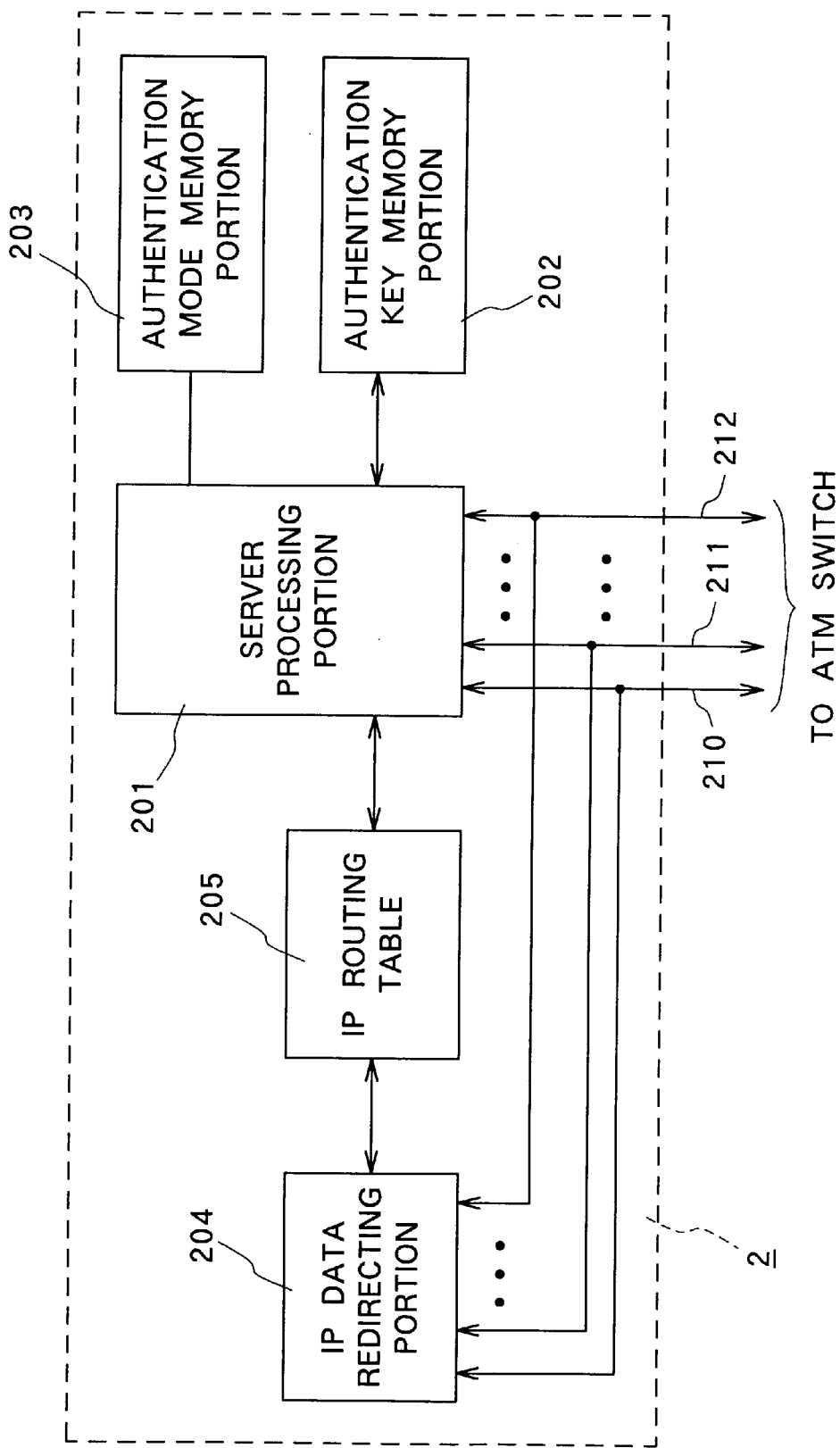
FIG. 2 is a block diagram depicting an example of a configuration of an NHS.

FIG. 2 shows a general configuration of an NHS. This NHS 2 comprises a server processing portion 201 for performing processing as an NHRP server, an authentication key memory portion 202 for storing authentication keys, an authentication mode memory portion 203 for storing authentication modes, an IP data redirecting portion 204 for redirecting IP packets, and an IP routing table 205 in which are stored routing data for use when an IP packet is redirected. The NHS 2 further comprises a plurality of interfaces (I/Fs) 210–212 which are connected to ATM switches within the ATM network. The server processing portion 201 is connected to the ATM network via interfaces 210–212. Similarly, the IP data redirecting portion 204 is connected to the network via interfaces 210–212.

The authentication key memory portion 202 is connected to the server processing portion 201 and stores the authentication keys and the types of the keys set for each of the interfaces 210–212. More precisely, an authentication key table is stored in the authentication key memory portion 202. As shown in FIG. 3 the authentication key table contains entries each consisting of an interface number field, an authentication key field and an authentication type for the interfaces of that NHS. For example, FIG. 4 shows the contents of the authentication table of the NHS-B 20 shown in FIG. 1.

The authentication mode memory portion 203 is connected to the server processing portion 201 and stores data indicating which authentication mode is to be used when redirecting an NHRP packet from a certain input interface to a certain output interface. Any one of the following modes is set as the authentication mode: 'drop mode', 'forward mode', and 'gateway mode'. More precisely, an authentication mode table is stored within the authentication mode memory portion 203. As shown in FIG. 5, the authentication mode table contains no more than the required number of entries each consisting of an input interface number field, an output interface number field and an authentication mode field. For example, if NHS-B 200 is set to operate in the forward mode when it is necessary to redirect an NHRP packet from LIS-B 20 to LIS-C 30 and to operate in the drop mode when it is is necessary to redirect an NHRP packet from LIS-C 30 to LIS-B 20, the authentication mode table 203 of NHS-B 200 will have the contents shown in FIG. 6.

Any given method can be used to set the above-mentioned authentication key and authentication mode. For example, settings may be described in configuration files for each terminal and each NHS, or setting may be carried out via the network.

In NHS 2 shown in FIG. 2, the IP data redirecting portion 204 operates the IP layer. In other words, when an IP packet has been inputted to NHS 2 via the interfaces 210–212, the server processing portion 201 does nothing while the IP data redirecting portion 204 processes the IP packet.

The IP routing table 205 is connected to the IP data redirecting portion 204 and is consulted when the IP data redirecting portion 204 redirects an IP packet received from one interface to another interface. Furthermore, the IP routing table 205 is also connected to the server processing portion 201 and is used when the server processing portion 201 redirects an NHRP packet received from one interface to another interface. The contents of the IP routing table 205 can be set statically by the network administrator, or set dynamically using a conventional routing protocol at an IP level such as an RIP (Routing Information Protocol) or an OSPF (Open Shortest Path First).

In FIG. 2, the IP data redirecting portion 204 and the IP routing table 205 are shown inside the NHS 2. However, if they are connected to the server processing portion 201 and the interfaces 210–212, it is not absolutely necessary for the IP data redirecting portion 204 and the IP routing table 205 to be provided within the NHS 2.

Authentication in the network system described above will next be explained using a number of separate cases.

Case 1

Firstly, a case in which the terminal 11 in FIG. 1 communicates with terminal 41 via the ATM network 1 will be explained. Since terminal 11 belongs to LIS-A 10 which is set to authentication type MD5 and authentication key A, the terminal 11 sends to NHS-A 100 an NHRP resolution request packet to which has been appended key A. Since the authentication type is MD5, the terminal 11 calculates an MD5 digest of the NHRP packet 51 to be sent using key A and puts the digest in an NHRP packet 51 authentication extension.

NHS-A 100 receives this NHRP packet 51 and authenticates it by means of the authentication extension appended to the packet and the key A allocated to the interface which has received the packet. Since the authentication type is MD5, authentication is carried out by extracting the MD5 digest from the authentication extension and comparing it with a recalculation of the MD5 digest of the NHRP packet 51 using the key A of the NHS-A 100. In this case, terminal 11 had the correct key A and therefore the NHRP packet 51 was determined to be proper.

Now it is supposed that terminal 12 which has a wrong key is connected to LIS-A 10 and has sent an NHRP resolution request packet to NHS-A 100. In this case, the packet 52 has a wrong key and therefore the NHS-A determines the NHRP packet 52 to be incorrect, discards the NHRP packet 52 and sends an error indication packet which denotes 'authentication failure' to terminal 12. In this way, terminal 12 can be prevented from making an unauthorized access to NHS-A 100.

Authentication can similarly be carried out in an LIS with a clear text authentication type such as LIS-C 30. In other words, in the case of a terminal belonging to LIS-A 10, an MD5 digest was put into the authentication extension as described above, but in the case of a clear text LIS, the key A itself is simply put into the authentication extension without altering the text format. Then, instead of carrying out a comparison with a recalculation of the MD5 digest, the NHS-A 100 simply extracts the key from the authentication extension and compares this key with the key of NHS-A 100 itself.

In the explanation which follows, the appending of an authentication extension will be termed 'appending a key' both in cases when the authentication type is MD5 and when the authentication type is clear text. Similarly, 'authentication using a key' refers to authentication using both an authentication extension and a key provided with an NHS.

Case 2

In the network shown in FIG. 1, it is assumed that any one of the following modes for redirecting transmitted data from one interface to another interface has been set in advance in the authentication mode memory portion of NHS-B 200: 'drop mode', 'forward mode', and 'gateway mode'. Setting the mode in advance in this manner enables an NHS positioned at the border of a certain domain of network administration to permit redirection of an NHRP packet from that domain to the outside while refusing to accept an NHRP packet sent to the domain from the outside thereof when the authentication types being used within and outside the domain are different.

The three modes mentioned above will next be explained.

The drop mode is an authentication mode which does not redirect NHRP packets between LIS having different authentication types. Of the authentication modes described here, the drop mode provides the strongest authentication.

The forward mode is an authentication mode which replaces the authentication key in the authentication extension and continually redirects NHRP packets even between LIS with different authentication types. Of the three authentication modes described here, the forward mode provides the weakest authentication.

The gateway mode is an authentication mode which, when there is an NHRP resolution request packet between LISs of different authentication types, terminates an SVC set up from the source terminal at the NHS or at another router by replying with address data of the NHS or the other router and then relies on the IP layer of the NHS or the router to process the IP packet received. Of the three modes described here, the gateway mode is weaker than the drop mode and stronger than the forward mode.

A summary of the example processing for an NHRP packet for each of the above-mentioned modes is shown in FIG. 7.

These authentication modes can be set using any given method. For example, settings for each NHS can be described in files, or setting can be performed via the network.

Here it is assumed that NHS-B 200 (FIG. 1) is set to operate in the drop mode when redirecting from interface #1 (I/F #1) to interface #2 (I/F #2). Consider a case in which an NHRP packet 51 from NHS-A 100 has arrived at NHS-B 200 in network 1 shown in FIG. 1. This NHRP packet 51 is, for example, an NHRP resolution request packet to resolve an ATM address of terminal 41. This NHRP packet 51 must be redirected unaltered to NHS-C 300 without being processed at NHS-B 200.

Figure 8A:
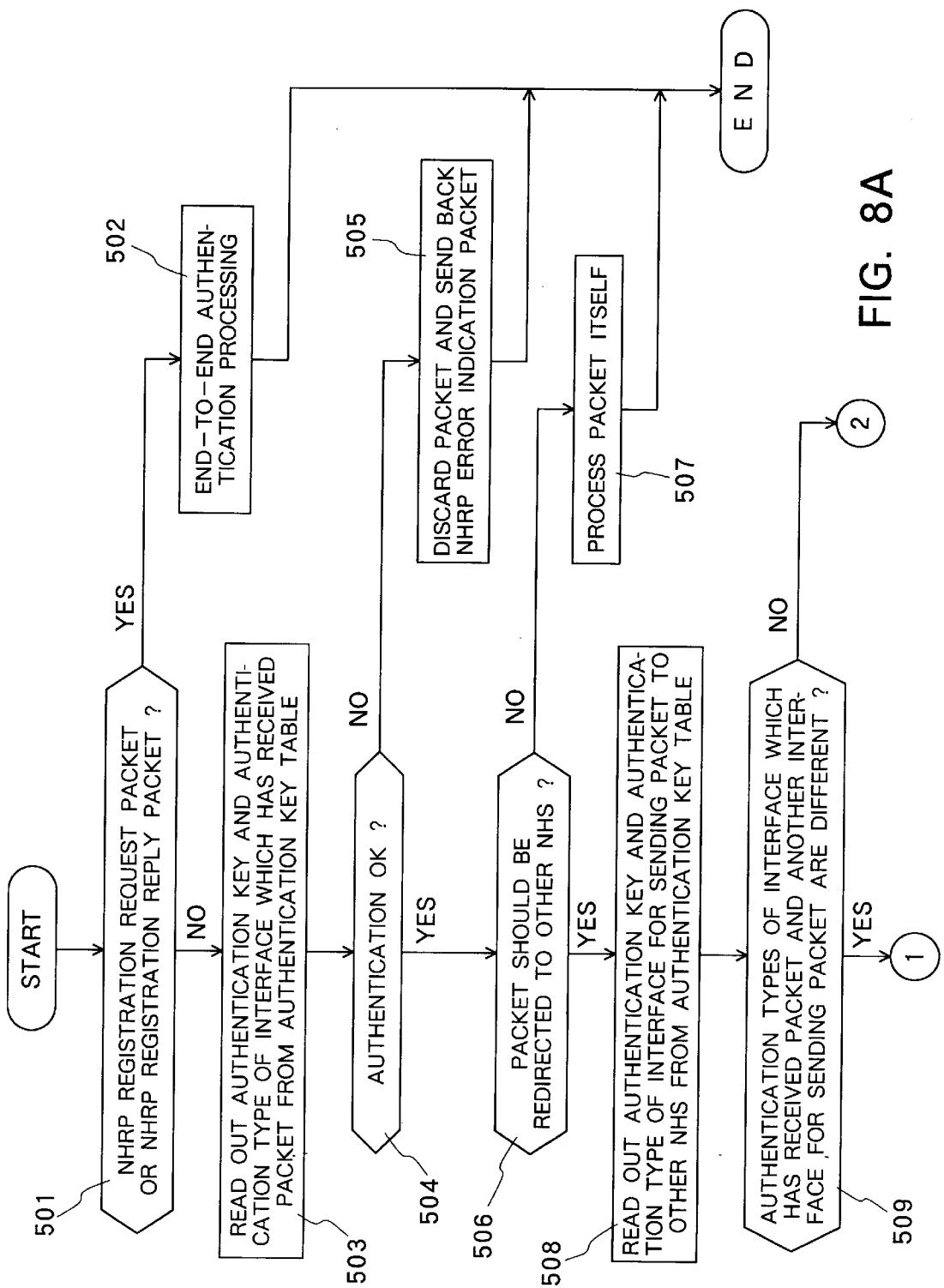
FIGS. 8A and 8B are flowcharts together showing an authentication sequence.
Figure 8B:
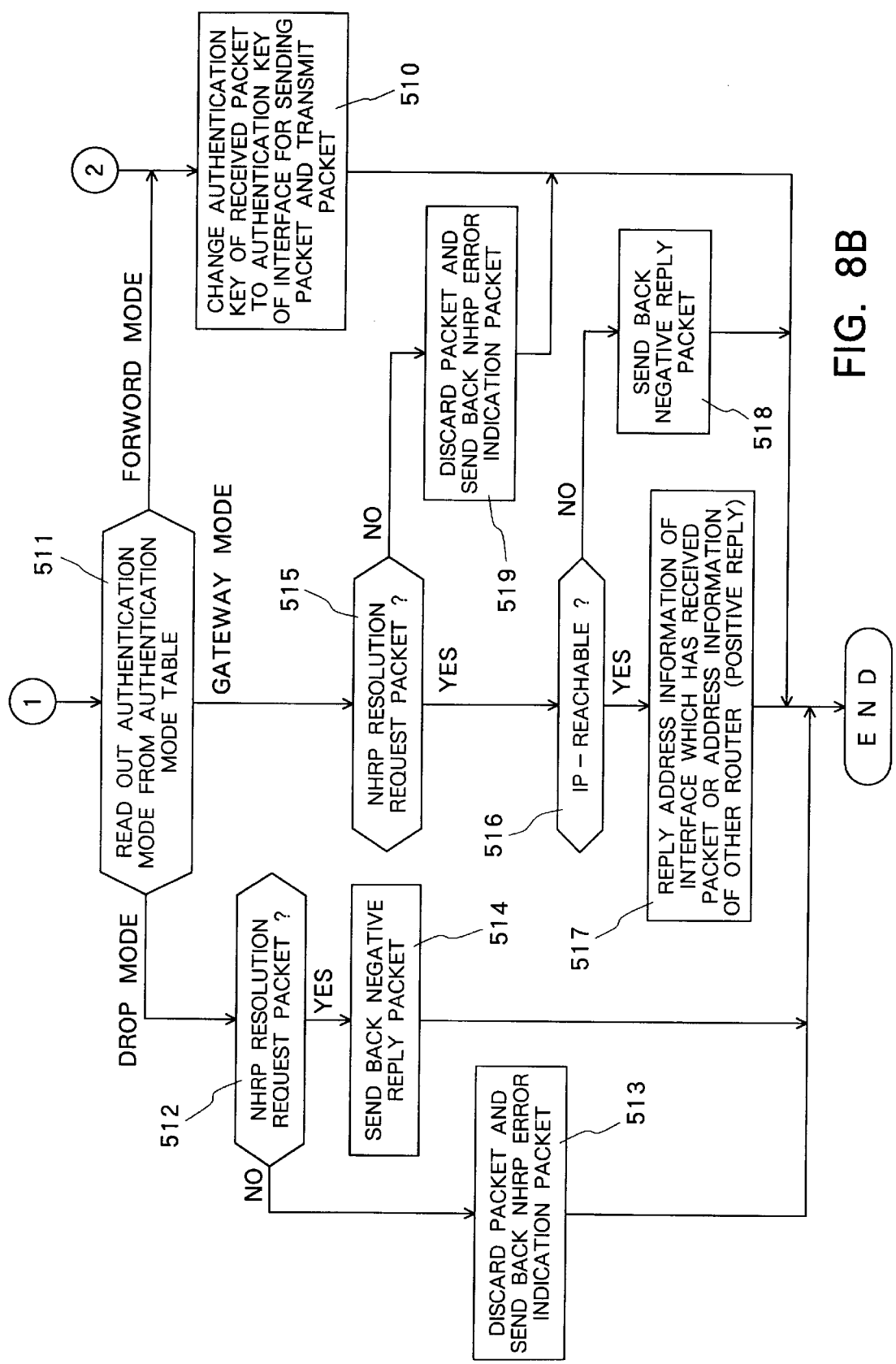

The operation of NHS-B 200 when the NHRP packet 51 has been received is shown in the flowcharts in FIGS. 8A and 8B.

Firstly, in Step 501 NHS-B 200 determines the type of the NHRP packet which it has received. When the received NHRP packet is an NHRP registration request packet or an NHRP registration reply packet, the operation shifts to Step 502 in which end-to-end authentication processing is carried out. In the end-to-end authentication processing, authentication processing is performed at the source station and at the destination station while the stations in between (i.e., each NHS) are not involved in the authentication processing.

Alternatively, when it is determined, in Step 501, that the received NHRP packet is of a type other than those mentioned above, hop-by-hop processing is carried out. In the hop-by-hop processing, authentication processing is performed at each station on the transmission route of the packet (in this case, at every NHS). In Step 503, NHS-B 200 reads out the authentication key and authentication type from the authentication key table in the authentication key memory portion 202 (FIG. 2) and performs authentication in Step 504. When the result of the authentication reveals that the packet is unauthorized, the NHRP packet is discarded and an NHRP error indication packet is sent back to the sender of that NHRP packet in Step 505. So far, this operation is identical to that in Case 1 described above.

However, when it has been determined in Step 504 that this NHRP packet is authorized, the NHS-B 200 determines in Step 506 whether the NHS-B 200 itself should process the packet or whether the packet must be redirected to another NHS. If the NHS-B 200 manages the address data of the terminal corresponding to that NHRP packet, the NHS-B 200 processes the NHRP packet itself in Step 507. In the present case however, the NHRP packet must be redirected to NHS-C 300 because NHS-B 200 does not manage the address data of terminal 41. The authentication key and authentication type allocated to the interface in order to transmit to NHS-C 300 are therefore extracted from the authentication key table in the authentication key memory portion 202 in Step 508.

Next, in Step 509 it is determined whether or not the authentication type of the authentication key allocated to the interface which has received the packet is the same as the authentication type of the interface to perform transmission. If these types are the same, the operation proceeds to Step 510 in which the authentication key in the received packet is changed to the authentication key of the transmitting interface; the NHRP packet is then sent to NHS-C 300.

In the present example, since the authentication type of the receiving interface differs from that of the transmitting interface, in Step 511 the NHS-B 200 extracts the authentication mode for redirecting transmission from input interface #1 to output interface #2 from the authentication mode table in the authentication mode memory portion 203 (FIG. 2).

As described above, the authentication mode of the NHS-B 200 for redirecting transmission from input interface #1 to output interface #2 is set to the drop mode in the present case. Consequently, the operation shifts to Step 512 in which it is determined whether or not the NHRP packet is an NHRP resolution request packet. When the packet is an NHRP resolution request packet, the NHS-B 200 sends back a negative reply packet in Step 514. When the packet is of any other type, the NHS-B 200 discards this NHRP packet and sends back an NHRP error indication packet in Step 513.

The drop mode, an authentication mode which does not redirect NHRP packets between LIS of different authentication types, is realized by means of the above operation.

Case 3

Here it is assumed that the NHS-B 200 is set to operate in the forward mode when redirecting from input interface #1 to output interface #2. Consider a case in which NHS-B 200 has received an NHRP packet. Having received the NHRP packet, NHS-B 200 performs the operations from Step 501 up to Step 511 as in Case 2 explained above. Since the authentication mode here is the forward mode, after the authentication mode has been extracted in Step 511 the operation proceeds to Step 510. In Step 510, the NHS-B 200 changes the authentication key in the authentication extension of the received NHRP packet to the authentication key of the outputting interface and sends the NHRP packet to the NHS-C 300.

The forward mode, the authentication mode which redirects NHRP packets between LISs of different authentication types, is realized by means of the above operation.

Case 4

In Case 4 the authentication mode of the NHS-B 200 is set to the gateway mode when redirecting from input interface #1 to output interface #2. It is supposed that NHS-B 200 has received an NHRP packet. Having received the NHRP packet, NHS-B 200 performs the operations from Step 501 up to Step 511 as in Case 2 explained above. Since the authentication mode here is the gateway mode, after the authentication mode has been extracted in Step 511 the operation proceeds to Step 515.

In Step 515, it is determined whether or not this NHRP packet is an NHRP resolution request packet. When the NHRP packet is not an NHRP resolution request packet, this NHRP packet is discarded and an NHRP error indication packet is sent back to the source station in Step 519. When it is determined in Step 515 that the NHRP packet is an NHRP resolution request packet, after consulting the IP routing table 205 NHS-B 200 determines whether or not the IP address to be resolved is IP-reachable from NHS-B 200 in Step 516. If it is not IP-reachable, the operation shifts to Step 518 in which NHS-B 200 sends back a negative reply packet. If it is IP-reachable, NHS-B 200 replies by sending back address data (i.e., positive reply packet) of the interface which received the NHRP packet.

Upon receiving this positive reply packet, the source terminal (e.g., terminal 11 in FIG. 1) is able to set up an SVC to NHS-B 200. As a result, the IP packet sent by the source terminal reaches the IP data redirecting portion 204 of NHS-B 200. The handling of this IP packet is delegated to the IP data redirecting portion 204 of NHS-B 200 and the IP data redirecting portion 204 processes the IP packet using a predetermined protocol. It is thus possible to use functions such as packet filtering at the IP level.

By the above operation it is possible to realize the gateway mode, the authentication mode in which, in the case of redirecting an NHRP resolution request packet between LISs of differing authentication types, an SVC to be set up from the source terminal is terminated at the NHS by the NHS replying its own address data and the IP data redirecting portion of the NHS then processes the received IP packet.

Case 5

Here it is assumed that the NHS-B 200 is set to operate in the gateway mode when redirecting from input interface #1 to output interface #2; in addition, it is assumed that NHS-B 200 is also programmed with the address data of the router 400. A case in which NHS-B 200 has received an NHRP packet will be considered. Having received the NHRP packet, NHS-B 200 performs the operations from Step 501 up to Step 515 as in Case 4 described above. NHS-B 200 then proceeds to Step 516 in order to determine whether or not the IP address to be resolved is IP-reachable.

In Step 516, it is determined whether or not the IP address to be resolved is IP-reachable from the router 400. For example, this can be determined based on statically set data (such as a file) indicating that LIS-D 40 is IP-reachable from the router 400; alternatively, in a case in which the NHS-B 200 is exchanging IP routing information with the router 400 according to a predetermined routing protocol, the determination can be based on the routing information being exchanged.

When it has been determined in Step 516 that the IP address to be resolved is not IP-reachable, NHS-B 200 sends back a negative reply packet in Step 518 as in Case 2. When the IP address is determined to be IP-reachable, NHS-B 200 sends back address data (i.e., positive reply packet) of the LIS-B 20 interface of router 400 in Step 517.

Upon receiving this positive reply packet, the source terminal (e.g., terminal 11 in FIG. 1) is able to set up an SVC to the router 400. As a result, the IP packet sent by the source terminal reaches the IP layer of the router 400. The handling of this IP packet can be delegated to the IP layer of the router 400. It is thus possible to use functions such as packet filtering at the IP level.

By the above operation it is possible to realize the gateway mode, the authentication mode in which, in the case of redirecting an NHRP resolution request packet between LISs of differing authentication types, an SVC to be set up from the source terminal is terminated at a router by the NHS replying address data of another router and the IP layer of the router then processes the received IP packet.

Case 6

Case 6 is the same as Cases 2, 3, 4 and 5, excepting that the NHS processes the NHRP packet in compliance with a set authentication mode, i.e., irrespective of the authentication types allocated to the input interface and the output interface.

It is supposed that NHS-B 200 has received an NHRP packet. Having received this NHRP packet, NHS-B 200 performs the operations from Step 501 up to Step 508 as in the cases already described. NHS-B 200 then proceeds to Step 511 without performing Step 509, that is to say, without determining whether the authentication type of the input interface is the same as the authentication type of the output interface.

In Step 511, NHS-B 200 extracts the authentication mode for redirection from input interface #1 to output interface #2 from the authentication mode table in the authentication mode memory portion 203. Processing is then performed in compliance with the extracted authentication mode as in any of Cases 2 to 5 described above. When the relevant authentication mode is not set in the authentication mode memory portion 203, processing is performed with the same operation as in the forward mode, for example.

Although the preferred embodiments of the present invention have been described in detail, it should be understood that various changes substitutions and alternations can be made therein without departing from spirit and scope of the inventions as defined by the appended claims.

What is claimed is:

1. An NHRP packet authentication method in an NHRP (Next Hop Resolution Protocol) for performing an address resolution for converting a network layer address in an NBMA (Non-broadcast, Multi-access) network to a datalink layer address, comprising steps of:

providing an NHRP server for performing an address resolution which has a plurality of interfaces belonging to respective sub-networks, maintaining an authentication key and an authentication type of the authentication key allocated to each of the interfaces in the NHRP server;

authenticating an NHRP packet received from one of the interfaces by using the authentication key allocated to the interface which receives the NHRP packet; and discarding the NHRP packet in case of authentication being unauthorized.

2. The NHRP packet authentication method according to claim 1, wherein:

in a case in which the NHRP packet received by the NHRP server has been authenticated using the authentication key allocated to the interface which receives the NHRP packet and the NHRP packet must then be redirected from a first interface to a second interface, the NHRP packet is discarded when the authentication type allocated to the first interface differs from the authentication type allocated to the second interface.

3. The NHRP packet authentication method according to claim 1, wherein:

in a case in which the NHRP packet received by the NHRP server has been authenticated using an authentication key allocated to the interface which receives the NHRP packet and the NHRP packet must then be redirected from a first interface to a second interface, when the authentication type allocated to the first interface differs from the authentication type allocated to the second interface, an authentication key part of the NHRP packet is changed to the authentication key allocated to the second interface and the NHRP packet is redirected from the second interface.

4. The NHRP packet authentication method according to claim 1, wherein:

in a case in which the NHRP packet received by the NHRP server has been authenticated using an authentication key allocated to the interface which receives the NHRP packet and the NHRP packet must then be redirected from a first interface to a second interface, when the authentication type allocated to the first interface differs from the authentication type allocated to the second interface, the NHRP server sends back address data of the first interface of said NHRP server.

5. The NHRP packet authentication method according to claim 4, wherein:

in a case in which a router redirects a packet between a sub-network to which the first interface belongs and a sub-network to which the second interface belongs, the authentication method uses interface address data of the sub-network to which the first interface belongs.

6. The NHRP packet authentication method according to claim 2, wherein:

the NHRP packet is processed in compliance with a set authentication mode, irrespective of whether or not the authentication type allocated to the first interface differs from the authentication type allocated to the second interface.

7. An NHRP packet authentication method in an NHRP (Next Hop Resolution Protocol) for performing an address resolution for converting a network layer address in an NBMA (Non-broadcast, Multi-access) network to a datalink layer address, comprising steps of:

providing an NHRP server for performing an address resolution which has a plurality of interfaces belonging to respective sub-networks, maintaining an authentication key and an authentication type of the authentication key allocated to each of the interfaces in the NHRP server;

maintaining an authentication mode which is defined to a combination of two of the interfaces in the NHRP server;

authenticating an NHRP packet received from one of the interfaces by using the authentication key allocated to an input interface which receives the NHRP packet; and determining whether the NHRP packet should be discarded or redirected based on a result of authentication and an authentication mode defined between the input interface and an output interface from which the NHRP packet is to be outputted.

8. The NHRP packet authentication method according to claim 7, wherein an authentication key included in the NHRP packet is changed in accordance with the authentication mode defined between the input interface and the output interface and then the NHRP packet is redirected through the output interface when the NHRP packet should be redirected.

9. An NHRP (Next Hop Resolution Protocol) server for performing an address resolution for converting a network layer address in an NBMA (Non-broadcast, Multi-access) network to a datalink layer address, comprising:

a plurality of interfaces belonging to respective sub-networks;

memory means for maintaining an authentication key and an authentication type of the authentication key allocated to each of the interfaces; and processing means for authenticating an NHRP packet received from one of the interfaces by using the authentication key allocated to the interface which receives the NHRP packet and discarding the NHRP packet in case of authentication being unauthorized.

10. An NHRP (Next Hop Resolution Protocol) server for performing an address resolution for converting a network layer address in an NBMA (Non-broadcast, Multi-access) network to a datalink layer address, comprising:

a plurality of interfaces belonging to respective sub-networks;

first memory means for maintaining an authentication key and an authentication type of the authentication key allocated to each of the interfaces;

second memory means for maintaining an authentication mode which is defined to a combination of two of the interfaces in the NHRP server; and processing means for authenticating an NHRP packet received from one of the interfaces by using the authentication key allocated to an input interface which receives the NHRP packet, and determining whether the NHRP packet should be discarded or redirected based on a result of authentication and an authentication mode defined between the input interface and an output interface from which the NHRP packet is to be outputted.

* * * * *